United States Patent
Shimizu et al.

(10) Patent No.: US 10,656,422 B2
(45) Date of Patent: May 19, 2020

(54) HEAD-MOUNTED DISPLAY AND IMAGE DISPLAY DEVICE

(71) Applicant: SEIKO EPSON CORPORATION, Tokyo (JP)

(72) Inventors: Takeshi Shimizu, Chino (JP); Shuichi Wakabayashi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/136,657

(22) Filed: Sep. 20, 2018

(65) Prior Publication Data

US 2019/0086673 A1    Mar. 21, 2019

(30) Foreign Application Priority Data

Sep. 21, 2017    (JP) ................. 2017-180985

(51) Int. Cl.
| | |
|---|---|
| G02B 27/01 | (2006.01) |
| H04N 13/344 | (2018.01) |
| G02B 26/12 | (2006.01) |
| G02B 27/09 | (2006.01) |
| G02B 5/20 | (2006.01) |
| G02B 26/10 | (2006.01) |

(52) U.S. Cl.
CPC ......... *G02B 27/0172* (2013.01); *G02B 5/205* (2013.01); *G02B 26/101* (2013.01); *G02B 26/12* (2013.01); *G02B 27/0977* (2013.01); *H04N 13/344* (2018.05); *G02B 2027/0121* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,798,149 | B1 * | 10/2017 | Saracco | G02B 27/108 |
| 2013/0106847 | A1 * | 5/2013 | Sugiyama | G03H 1/2294 |
| | | | | 345/419 |

FOREIGN PATENT DOCUMENTS

| | | |
|---|---|---|
| JP | 2009-086365 A | 4/2009 |
| JP | 2010-117541 A | 5/2010 |
| JP | 2010-210965 A | 9/2010 |

* cited by examiner

*Primary Examiner* — Robin J Mishler
(74) *Attorney, Agent, or Firm* — Oliff PLC

(57) ABSTRACT

An optical attenuator, when damaged, loses not only a light attenuation function but also part of an optical path shift function utilizing a refractive effect, and thus an optical path shift function in a normal state is lost. Thus, it is possible to diverts an optical path of modulate light, which is a laser beam, from a direction toward a mirror surface, that is, a direction toward the eye of an observer.

14 Claims, 17 Drawing Sheets

HEAD-MOUNTED DISPLAY AND IMAGE DISPLAY DEVICE

The present application is based on and claims priority from JP Application Serial Number 2017-180985, filed Sep. 21, 2017, the disclosure of which is hereby incorporated by reference herein in its entirety.

BACKGROUND

1. Technical Field

The disclosure relates to a head-mounted display and an image display device.

2. Related Art

As an image display technology for head-mounted displays (HMDs), an image display device that irradiates the retina of the eyes directly with a laser beam to allow a user (or an observer) to view an image has been known (for example, referring to JP-A-2009-086365). For the above-described retina-scanning head-mounted display using a laser beam and the like, it is required to reduce the energy of light, with which the retina is to be irradiated, to protect the eyes. However, in terms of image formation, to maintain stable laser oscillation and ensure a sufficient range of gradation levels in a laser source, that is, a light emitting source, it is expected for laser sources currently in use to have a certain power output or greater (e.g., several tens to several hundreds of milliwatts). With a laser source having a power output of several tens to several hundreds of milliwatts, since a very small amount of component of image light (e.g., 0.1% of the total power output or less) is to be used from the perspective of protecting the eyes, most components are cut off before reaching the eyes. For example, JP-A-2009-086365 discloses a neutral density filter serving as means for reducing the energy of light to reach the eyes.

There is a possibility that when the neutral density filter is damaged and fails to achieve dimming function in such an HMD, a laser beam with its original intensity emitted from a laser source may enter the retina. Therefore, taking this into account, a high degree of safety is required.

It is also known that a laser scanning device installed in a laser printer, but not for the light attenuation to allow the retina of the eyes to be irradiated directly with a laser beam as described above, includes a light amount control optical system which has four neutral density filters whose light incident surface and light emission surface are not parallel to each other, and shifts a light beam to control the amount of the light beam (for example, referring to JP-A-2010-210965).

SUMMARY

The disclosure provides a head-mounted display and an image display device which have a simple configuration and a high degree of safety such that a laser beam with high intensity is prevented from traveling to the eyes of the observer even when a neutral density filter is damaged.

A head-mounted display according to the disclosure includes a laser source unit configured to emit a laser beam, a light scanner configured to perform scanning with the laser beam emitted from the laser source unit, and an optical attenuator disposed in an optical path between the laser source unit and the light scanner, the optical attenuator being configured to attenuate a passing laser beam and shift an optical path of the passing laser beam by utilizing a refractive effect to guide the laser beam toward a mirror surface of the light scanner.

In the head-mounted display, the optical attenuator, which is disposed in an optical path to attenuate a passing laser beam, shifts an optical path of the laser beam by utilizing the refractive effect to guide the laser beam to a mirror surface of the light scanner. With that configuration, the optical attenuator, when damaged, loses not only the light attenuation function but also the optical path shift function utilizing the refractive effect of the optical attenuator. Therefore, the optical path of the laser beam is diverted from the direction toward the mirror surface, that is, the direction toward the eyes of an observer. In other words, the laser beam with high intensity emitted from the laser source unit is prevented from not being attenuated and traveling to the eyes of the observer directly, and thus safety is increased.

In a specific aspect of the disclosure, the optical attenuator may be configured using a material, in a shape, and to be disposed to equalize optical path lengths of components with different wavelengths when shifting the optical path of the laser beam. With that configuration, even when the refractive angle of the laser beam entering the optical attenuator in a combined state is changed depending on its wavelength, it is brought into a state where the laser light is recombined when the laser beam is emitted from the optical attenuator.

In another aspect of the disclosure, the optical attenuator may include a first optical attenuator configured to shift the optical path to divert the optical path from a direction toward the mirror surface of the light scanner, and a second optical attenuator configured to counteract the shift of the optical path at the first optical attenuator to return the optical path back. With that configuration, for example, even when one of the first optical attenuator and the second optical attenuator is damaged, the optical path of the laser beam is diverted from a direction toward the mirror surface.

In still another aspect of the disclosure, the second optical attenuator may counteract dispersion of light caused by the refractive effect at the first optical attenuator. With that configuration, even when the refractive angle of the laser beam entering the first optical attenuator is changed depending on its wavelength, the second optical attenuator counteracts the change in the refractive angle, and it is brought into a state where the laser light is recombined when the laser beam is emitted from the second optical attenuator.

In still another aspect of the disclosure, the first optical attenuator and the second optical attenuator may have an identical optical shape. With that configuration, the symmetry between the first and second optical attenuators makes it easy to fabricate the optical attenuators at high accuracy.

In still another aspect of the disclosure, a light incident angle to the first optical attenuator and a light emission angle from the second optical attenuator may be equal, and a light emission angle from the first optical attenuator and a light incident angle to the second optical attenuator may be equal. With that configuration, the laser beams passing through the first optical attenuator and the second optical attenuator is emitted in a state where the laser beams are combined.

In still another aspect of the disclosure, the head-mounted display may further include a light reflector configured to bend the laser beam passing through the first optical attenuator to guide the laser beam toward the second optical attenuator. That configuration makes the device smaller.

In still another aspect of the disclosure, the light reflector may be disposed at a position deviated from an optical path of the laser beam in a case that there is no shift of the optical path due to the refractive effect at the first optical attenuator. With that configuration, when the first optical attenuator is damaged and loses the optical path shift function utilizing the refractive effect of the first optical attenuator, the laser beam is not reflected by the light reflector and travels to a different direction. In other words, the laser beam is diverted from the direction toward the mirror surface of the light scanner, that is, the direction toward the eyes of the observer.

In still another aspect of the disclosure, the light reflector may be a light attenuating reflector configured to attenuate the laser beam and guide part of the laser beam toward the second optical attenuator. With that configuration, the laser beam is also attenuated by the light reflector.

In still another aspect of the disclosure, the head-mounted display may further include an angle fixing member configured to fix the first optical attenuator, the second optical attenuator, and the light reflector to maintain angular relationship among the first optical attenuator, the second optical attenuator, and the light reflector. With that configuration, the angle fixing member maintains a disposition relationship among each member in an accurate state.

In still another aspect of the disclosure, the head-mounted display may further include a light shutter disposed in an optical path of the laser beam in a case that there is no shift of the optical path due to the refractive effect at the optical attenuator, to shut out the laser beam. With that configuration, when the optical attenuator is damaged and loses the optical path shift function utilizing the refractive effect of the optical attenuator, the laser beam travels to the light shutter and is shut out by the light shutter. In other words, the laser beam is diverted from the direction toward the mirror surface of the light scanner, that is, the direction toward the eyes of the observer.

In still another aspect of the disclosure, the light shutter may be a fixing member configured to fix the optical attenuator. With that configuration, the light shutter is provided not as an additional part.

In still another aspect of the disclosure, the optical attenuator may include a plurality of flat plate members. With that configuration, the optical attenuator is easily fabricated at high accuracy.

A image display device according to the disclosure includes a laser source unit configured to emit a laser beam, a light scanner configured to perform scanning with the laser beam emitted from the laser source unit, and an optical attenuator disposed in an optical path between the laser source unit and the light scanner, the optical attenuator being configured to attenuate a passing laser beam and shift an optical path of the laser beam by utilizing a refractive effect to guide the passing laser beam to a mirror surface of the light scanner.

In the image display device, the optical attenuator, which is disposed in an optical path to attenuate a passing laser beam, shifts an optical path of the laser beam by utilizing a refractive effect to guide the laser beam to the mirror surface of the light scanner. With that configuration, the optical attenuator, when damaged, loses not only the light attenuation function but also the optical path shift function utilizing the refractive effect of the optical attenuator. Loss of the functions diverts the optical path of the laser beam from the direction toward the mirror surface, for example, the direction toward the eyes of an observer. In other words, the laser beam with high intensity emitted from the laser source unit is prevented from not being attenuated and traveling to the eyes of the observer directly, and thus safety is increased.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

First Exemplary Embodiment

An example of a head-mounted display (HMD) serving as an image display device according to First Exemplary Embodiment will be described in detail below with reference to FIG. 1 and the like.

Figure 1:
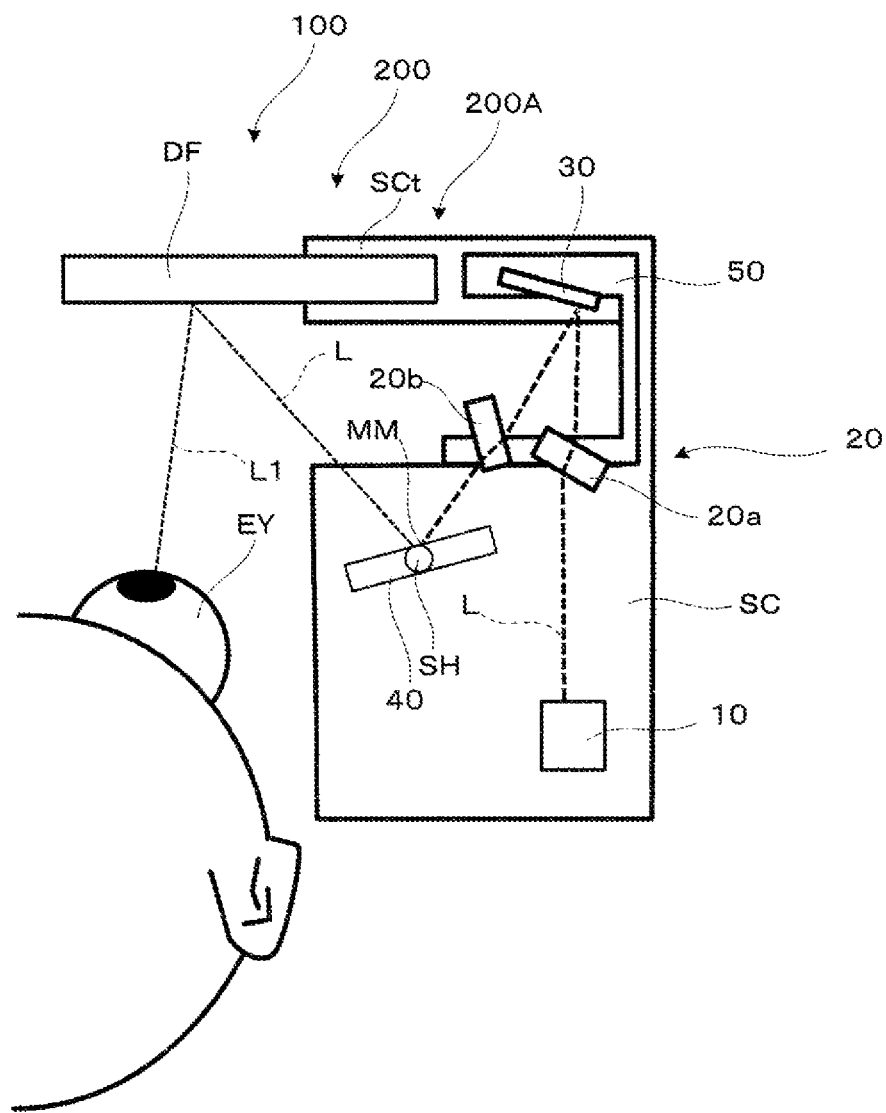
FIG. 1 conceptually illustrates a head-mounted display according to First Exemplary Embodiment.

As conceptually illustrated in FIG. 1, a head-mounted display 100 of First Exemplary Embodiment is a head-mounted display device to be mounted on the head of an observer in use, and is also an image display device that allows the observer or a user to view an image light. As an example, the head-mounted display 100 is configured to allow the observer to view a superimposed image of an image of image light and an outside image. The head-mounted display 100 has an appearance like glasses that is symmetrical in the left-and-right direction, and in light of the symmetry, FIG. 1 illustrates the right half but does not illustrate the whole configuration of the head-mounted display 100 including the left half.

As illustrated in FIG. 1, in the head-mounted display 100, a display unit 200, which corresponds to a configuration on the right eye side, includes an image light generator 200A and a deflector DF serving as a reflecting mirror. In a state where the head-mounted display 100 is worn, the image light generator 200A is disposed on the right side of the head of the observer, and the deflector DF is disposed in front of the eye of the observer (forward of the right eye).

In the display unit 200, the image light generator 200A includes a laser source unit 10, an optical attenuator 20, a light reflector 30, a light scanner 40, and a fixing member 50, which are stored in a housing SC. In the example illustrated in FIG. 1, the deflector DF is mounted to a leading end side SCt of the housing SC, and the whole display unit 200 is integrated as one unit. However, the respective elements may be separated.

In the image light generator 200A, the laser source unit 10 combines light beams of a plurality of colors with different wavelengths to generate and emit modulated light L to be image light. The laser source unit 10 includes three light sources that generate light beams of, for example, three colors, R, G, and B, to display a full-color image. As the laser source unit 10, a laser diode may be used, for example. The light sources of the laser source unit 10, detailed description being omitted, are separately drive-controlled through drive circuits respectively provided, under control of a controller, to generate modulated light modulated based on an image signal. The modulated light L generated from the respective color light beams emitted from the laser source unit 10 enters the optical attenuator 20.

The optical attenuator 20 is a member for attenuating a passing laser beam, and includes two neutral density filters (ND filters) of a first optical attenuator 20a and a second optical attenuator 20b. As illustrated in FIG. 1, the first optical attenuator 20a and the second optical attenuator 20b are parallel flat plate members disposed with the light incident surfaces and light emission surfaces inclined with respect to the direction of the optical path (course) of the modulated light L, which is a laser beam emitted from the laser source unit 10. In that configuration, the modulated light L enters the first optical attenuator 20a and the second optical attenuator 20b at a certain incident angle. Accordingly, the optical attenuator 20 causes the passing laser beam not only to be attenuated but also to be refracted. The first optical attenuator 20a and the second optical attenuator 20b also have an identical shape. A configuration and a disposition of the first optical attenuator 20a and the second optical attenuator 20b which are a pair constituting the optical attenuator 20 will be described in detail later.

The light reflector 30 is a light reflecting mirror that is disposed between the first optical attenuator 20a and the second optical attenuator 20b in an optical path of the modulated light L, and bends the modulated light L passing through the first optical attenuator 20a of the optical attenuator 20 to guide the modulated light L toward the second optical attenuator 20b. The light reflector 30 is also a light attenuating reflecting reflector that attenuates the modulated light L passing therethrough, and reflects a partial component of the modulated light L to guide the reflected component toward the second optical attenuator 20b. In other words, the light reflector 30 has a function of attenuating the modulated light L. In First Exemplary Embodiment, since the laser source unit 10 emitting a laser beam is used as a light source, it may be difficult to reduce the intensity (power output) of the laser beam at the light source side. The optical attenuator 20 is provided to resolve that difficulty, and in addition, the light reflector 30 further attenuates the modulated light L. Such a configuration that the light reflector 30 bends the optical path (course) of the modulated light L to be integrated in a small space around the face of the observer, makes the device smaller.

The light reflector 30 may be a reflecting mirror that reflects most of the modulated light L.

The light scanner 40 is an optical scanner that spatially (two-dimensionally) scans the deflector DF with modulated light passing through the second optical attenuator 20b of the optical attenuator 20. The light scanner 40 is, as an example, a microelectromechanical systems (MEMS) mirror in which a mirror surface MM at which the modulated light L is reflected is formed on a movable portion disposed at the center of an actuator. The MEMS mirror performs biaxial driving (only one axial shaft SH illustrated in FIG. 1) in a way that the movable portion having the mirror surface MM is swingably (rotatably) supported, and thus performs two-dimensional scanning in the left-and-right direction (horizontal direction) and the up-and-down direction (vertical direction). The light scanner 40, detailed description and illustration being omitted, is configured to detect an orientation (swing angle) of the movable portion, that is, the mirror surface MM, from changes in resistance of a sensor, such as a piezoelectric, provided to the axial shaft SH. The detection result is used to synchronize the emission of the modulated light L with the orientation of the mirror surface MM, thus performing intended optical beam scanning. The configuration described above of the light scanner 40 is an example, and is not limited thereto as long as it performs two-dimensional scanning with the modulated light L. For example, the light scanner 40 may include two optical scanners each performing one-dimensional scanning with the modulated light L, or may be configured to use a polygon mirror or a galvano mirror in place of the optical scanner. The orientation of the mirror surface MM may be also detected in another way not using a piezoelectric.

The fixing member 50 is a member (jig) for fixing the optical attenuator 20 and the like, and in particular, functions as an angular fixing member that fixes the first optical attenuator 20a and the second optical attenuator 20b, which constitute the optical attenuator 20, and the light reflector 30, to maintain their angular relationship. The fixing member 50 fixes these members to maintain their angular relationship and maintain a disposition relationship among the members and also the laser source unit 10 and the light scanner 40, which are separately installed in the housing SC.

In the display unit 200, the deflector DF is constructed from, for example, an aspherical half mirror and the like. The deflector DF to be disposed in front of the eyes of the observer has a size large enough to cover the right eyes EY of the observer, and has a function that causes the modulated light with which the light scanner 40 performs scanning, to enter the right eye EY of the observer as image light. In other words, the deflector DF is a member having a function that deflects the modulated light to the direction of the eyes of the observer and emits the modulated light as image light. The deflector DF, which is constructed with, for example, a half mirror, enables the head-mounted display 100 to be provided as a see-through type that allows the observer to view not only image light but also an outside image. Furthermore, the deflector DF may be constructed with a holographic element (holographic mirror) which is a type of diffraction grating.

The holographic element is a semi-transmissive film having characteristics that diffract light within a specific wavelength range and transmit light within the other ranges. That configuration also enables the head-mounted display 100 to be provided as a see-through type.

In the display unit 200, a path in which the modulated light L, which is a laser beam, is emitted from the laser source unit 10 and reaches the right eye EY of the observer is described below. First, the laser source unit 10 generates and emits modulated light L modulated based on an image signal. Next, the first optical attenuator 20a of the optical attenuator 20 attenuates (reduces) the modulated light L, and shifts an optical path of the modulated light L by utilizing a refractive effect to emits the modulated light L to the light reflector 30. Next, the light reflector 30 transmits a partial component of the modulated light L passing through the first optical attenuator 20a to attenuate (reduce) the modulated light L, and reflects and guides the other component toward the second optical attenuator 20b of the optical attenuator 20 as the modulated light L. Next, the second optical attenuator 20b further attenuates (reduces) the modulated light L reflected by the light reflector 30, and shifts an optical path of the modulated light L by utilizing a refractive effect to guide the modulated light L to the mirror surface MM of the light scanner 40. Next, the light scanner 40 spatially (two-dimensionally) scans the deflector DF with the modulated light L. The deflector DF generates image light L1 from the scanned modulated light L, and the image light L1 is guided to the right eye EY of the observer.

A display unit for the left-eye has substantially identical configuration as the display unit for the right-eye to guide modulated light obtained by modulating a laser beam to the left eye.

The configuration as described above allows the observer to view an image according to an image signal. The head-mounted display 100 of First Exemplary Embodiment is a binocular HMD, but the head-mounted display 100 may be a monocular HMD. That is, one of the left-eye and the right-eye display units may be omitted.

For that the retina-scanning head-mounted display 100 using a laser beam as described above, it is required to reduce the energy of light, with which the retina is to be irradiated, to protect the eyes EY, and the energy of light may be advantageously reduced down to, for example, approximately 1 microwatt or less before being incident on the eyes EY. On the other hand, in terms of image formation, it is expected for a light source to have, for example, a power output of several tens to several hundreds of milliwatts. Thus, for example, it is required that the modulated light L is reduced by a factor of approximately 100000 in a path from the laser source unit 10 to the eyes EY.

In this respect, in First Exemplary Embodiment, as described above, the optical attenuator 20 and also the light reflector 30 perform light attenuation. Of these members, the light reflector 30 guides the modulated light L, which is a component to be viewed, through reflection. That is, the modulated light L is reflected to travel in the direction toward the light scanner 40, in particular, the direction toward the eyes of the observer. Thus, the light reflector 30, when damaged, loses the reflection function, and accordingly loses the guide function that guides the light in the direction toward the eyes of the observer. Therefore, the modulated light L which is a laser beam is prevented from not being attenuated due to damage to the light reflector 30 and traveling in the direction toward the eyes EY. On the other hand, since the optical attenuator 20 attenuates the modulated light L through transmission and guides the modulated light L in the direction toward the EY of the observer, there is still a possibility that the modulated light L travels in the direction toward the eyes EY when the optical attenuator 20 is damaged and loses the effect of light attenuation. In other words, there is a possibility that the modulated light L is not attenuated and thus the modulated light L with high intensity travels to the eyes EY of the observer. In particular, since the first optical attenuator 20a of the optical attenuator 20 is close to the laser source unit 10, light absorption to attenuate the laser beam is more likely to damage the first optical attenuator 20a because of, for example, heat, as compared to the other elements. In First Exemplary Embodiment, to avoid such incident, the optical attenuator 20 shifts the optical path of the modulated light L, which is a laser beam, by utilizing a refractive effect, to adjust the optical path when the optical attenuator 20 is damaged, thus increasing safety when the optical attenuator 20 is damaged.

Adjustment of the optical path of the modulated light L from the optical attenuator 20 to the light reflector 30 is described below with reference to FIG. 2. That is, FIG. 2 conceptually illustrates an example of shift of the modulated light L, which is a laser beam, at the optical attenuator 20.

Figure 2:
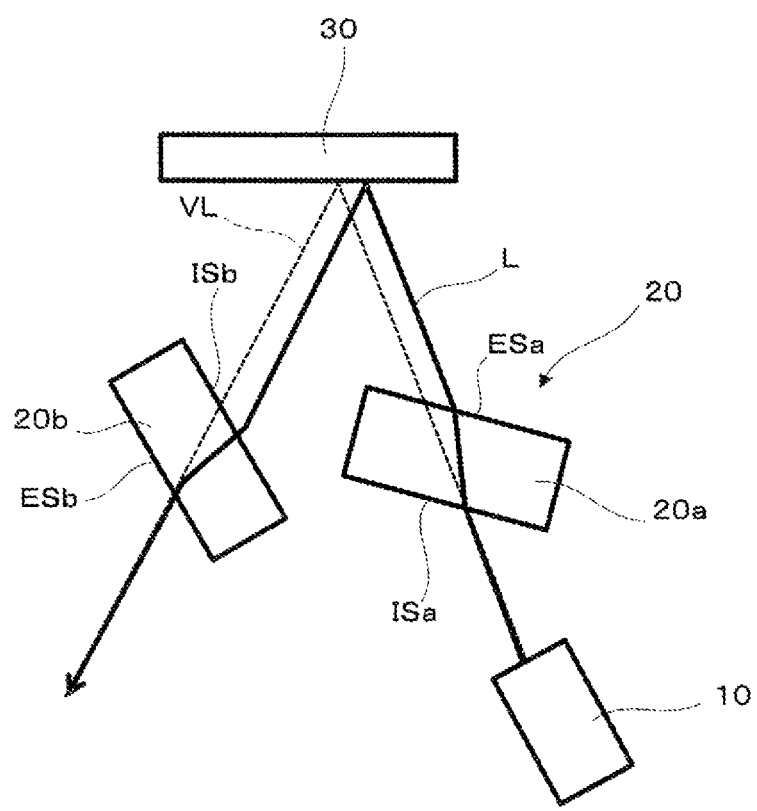
FIG. 2 conceptually illustrates an example of shift of a laser beam at an optical attenuator.

In FIG. 2, for convenience of explanation, an optical path (trace) of the modulated light L passing therethrough in the case of no optical attenuator 20 is represented as a virtual optical path VL. The virtual optical path VL is an optical path traveling to the light scanner 40 (refer to FIG. 1), in particular, an optical path to reach the eyes EY of the observer. In contrast, by the first optical attenuator 20a of the optical attenuator 20, the modulated light L is shifted closer to the right side (a side away from the observer) than the traveling direction of the virtual optical path VL. In other words, a light incident surface ISa of the first optical attenuator 20a is disposed to be inclined at a certain angle with respect to a direction perpendicular to the traveling direction in order to refract the modulated light L such that the modulated light L entering the light incident surface ISa is shifted to the right side with respect to the traveling direction of the modulated light L. The first optical attenuator 20a is a parallel flat plate, and accordingly, a light emission surface ESa of the first optical attenuator 20a is inclined at the same angle as the light incident surface ISa. As described above, the modulated light L undergoes refraction twice, i.e., at the light incident surface ISa and the light emission surface ESa, and as a result, is emitted from the light emission surface ESa with its traveling direction (angle) returned to the original one but shifted. After that, the modulated light L is reflected by the light reflector 30. Thus, the modulated light L is emitted from the light reflector 30 at a point closer to the left side with respect to the traveling direction than the virtual optical path VL. Next, the modulated light L enters a light incident surface ISb of the second optical attenuator 20b of the optical attenuator 20, and is emitted from the light emission surface ESb. The modulated light L is refracted twice in the second optical attenuator 20b and thus shifted to the right side (a side closer to the observer) with respect to the traveling direction, so that the traveling direction (angle) and the emission position of the modulated light L are equal to the traveling direction (angle) and the emission position of the virtual optical path VL. To summarize, in the optical attenuator 20, the first optical attenuator 20a shifts the modulated light L to be diverted from the direction toward the mirror surface MM of the light scanner 40. On the other hand, the second optical attenuator 20b shifts the modulated light L to counteract the shift at the first optical attenuator 20a to return the optical path back. As a result, the optical attenuator 20 attenuates the passing modulated light L, and shifts its optical path by utilizing a refractive effect to guide the modulated light L to the mirror surface MM of the light scanner 40, as a whole. With the configuration described above, when the first optical attenuator 20*a* is damaged, refraction does not occur in the first optical attenuator 20*a*, and thus, the modulated light L travels without deviating from the virtual optical path VL. In this case, unlike the case that the incident position of light on the second optical attenuator 20*b* is shifted by the first optical attenuator 20*a*, the modulated light L emitted from the light emission surface ESb has different traveling direction (angle) and emission position. That is, the modulated light L deviates from the direction toward the mirror surface MM of the light scanner 40. When the second optical attenuator 20*b* is damaged, refraction does not occur in the second optical attenuator 20*b*, and thus, the modulated light L travels without cancellation of the shift at the first optical attenuator 20*a*. As a result, the modulated light L still deviates from the direction toward the mirror surface MM of the light scanner 40.

As described above, in First Exemplary Embodiment, the optical attenuator 20, when damaged, loses not only the light attenuation function but also part of the optical path shift function utilizing the refractive effect at the optical attenuator 20, and thus an optical path shift function in a normal state is lost. Therefore, the optical path of the modulated light L, which is a laser beam, is diverted from the direction toward the mirror surface MM, that is, the direction toward the eyes EY of the observer. As a result, a component of the laser beam with high intensity emitted from the laser source unit 10 is prevented from not being attenuated and traveling to the eyes EY of the observer directly, and thus safety is increased.

Furthermore, First Exemplary Embodiment takes into account optical dispersion characteristics associated with the refractive effect at the optical attenuator 20. Regarding transmission of light in the first optical attenuator 20*a* and the second optical attenuator 20*b*, some materials used in these optical attenuators may have different refractive indices depending on the laser beams of respective colors (wavelengths) emitted from the laser source unit 10, thus causing a different optical path for each color. By contrast, in First Exemplary Embodiment, the first optical attenuator 20*a* and the second optical attenuator 20*b* are configured to counteract the light dispersion caused by the refractive effect at one optical attenuator with light dispersion caused by the refractive effect at the other attenuator. To this end, the optical attenuator 20 is designed to adopt specific material, shape, and disposition such that the optical path of the modulated light L, which is a laser beam, after being shifted has equal optical path lengths (optical distance) among components with different wavelengths.

Figure 3A:
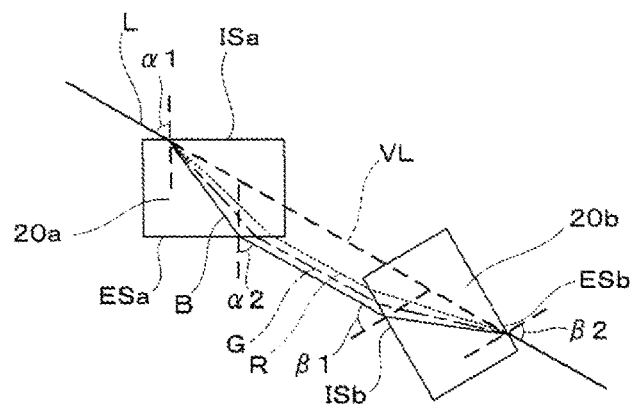
FIG. 3A illustrates an optical path in the optical attenuator.

An optical path for each color in the case of First Exemplary Embodiment is described below with reference to FIG. 3A and the like. FIG. 3A illustrates an optical path taken apart for explanation of the optical path in the optical attenuator. In other words, FIG. 3A conceptually illustrates the optical path taken apart, of the light beam before and after returned by the light reflector 30 in FIG. 1 and the like. As in other drawings, the shifted modulated light L ultimately coincides with the virtual optical path VL. In the case illustrated in FIG. 3A, as in the case described above, the modulated light L is refracted at the light incident surface ISa of the first optical attenuator 20*a*. However, more correctly, FIG. 3A illustrates slightly-different traveling directions of the respective color light beams because its refractive index is different depending on the color light beam of R, G, or B. That is, even when each of the color light beams R, G, and B enters the light incident surface ISa at the same position and at the same angle, each traveling direction is different because of dispersion of light. Therefore, each emission position on the light emission surface ESa is different, and each incident position on the light incident surface ISb of the second optical attenuator 20*b* is also different. However, the color light beams R, G, and B are emitted at the same position and at the same angle from the light emission surface ESb after undergoing refraction, that is, combined, because of the refractive effect at the second optical attenuator 20*b*. In other words, the second optical attenuator 20*b* adopts specific material, shape, and disposition such that the light dispersion due to the refractive effect at the first optical attenuator 20*a* is counteracted.

To make the modulated light L travel in the optical path as described above, as an example, the first optical attenuator 20*a* and the second optical attenuator 20*b* are constructed with the same material and have an identical shape. That is, the optical attenuators are parallel flat plates and have the same thickness. The light incident surfaces ISa and ISb, and the light emission surfaces ESa and ESb each have a size large enough to prevent their end from interfering with the optical path. In other words, these surfaces have an identical optical shape.

The first optical attenuator 20*a* and the second optical attenuator 20*b* are disposed such that a light incident angle $\alpha 1$ onto the first optical attenuator 20*a* is equal to a light emission angle $\beta 2$ from the second optical attenuator 20*b*, and a light emission angle $\alpha 2$ (for the blue light beam B illustrated as a representative in FIG. 3A) from the first optical attenuator 20*a* is equal to a light incident angle $\beta 1$ (for the blue light beam B illustrated as a representative in FIG. 3A) onto the second optical attenuator 20*b*. With that configuration, the modulated light L travels in the optical path described above.

The foregoing configuration is a configuration example of the optical attenuator 20 that equalizes the optical path lengths (optical distances) of components with different wavelengths. The optical attenuator 20 may adopt, for example, appropriate materials, shapes, and disposition, other than a parallel flat plate shape, designed as a configuration which achieve the same object. For example, the first optical attenuator 20*a* may be constructed with one piece of member, and the second optical attenuator 20*b* may be constructed with two pieces of members. That is, light dispersion caused by a refractive effect at the first optical attenuator 20*a* constructed with one piece of member may be counteracted with light dispersion caused by a refractive effect at two pieces of member constituting the second optical attenuator 20*b*. The optical attenuator 20 may be constructed with four or more pieces of members.

Figure 3B:
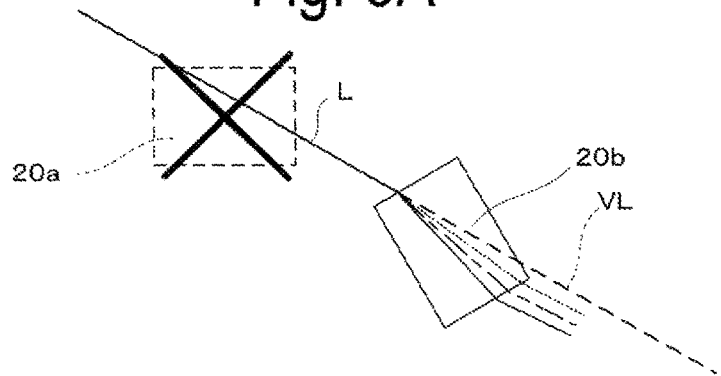
FIG. 3B illustrates an optical path in a case that a part of the optical attenuator is damaged.
Figure 3C:
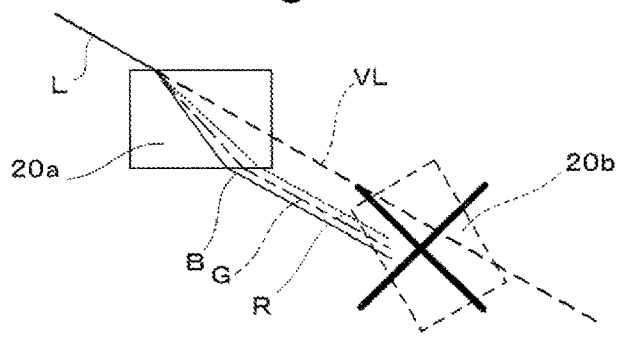
FIG. 3C illustrates an optical path in a case that another part of the optical attenuator is damaged.

In the optical attenuator 20 having the configuration exemplified in FIG. 3A, as illustrated in FIG. 3B, when the first optical attenuator 20*a* is damaged, neither shift nor light dispersion as described above occurs, and the modulated light L travels in a direction deviating from the expected optical path (e.g., the virtual optical path VL illustrated in FIG. 3A and others). As illustrated in FIG. 3C, when the second optical attenuator 20*b* is damaged, light dispersion caused by the refractive effect at the first optical attenuator 20*a* occurs, but each component of light beam is not returned to the expected optical path and thus the modulated light L travels in a direction deviating from the expected optical path.

Figure 3D:
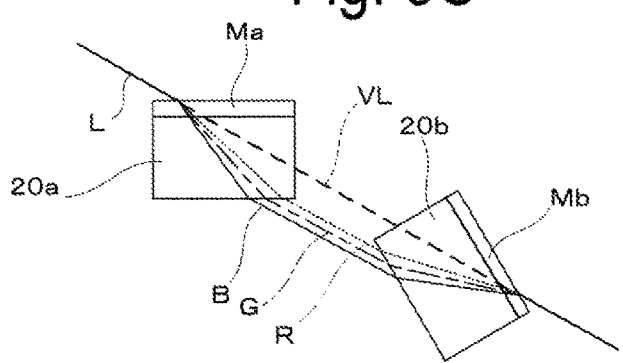
FIG. 3D illustrates an optical path in a modified example of an optical attenuator.

The first optical attenuator 20a and the second optical attenuator 20b may be fabricated in various ways. For example, as illustrated in FIG. 3D, dielectric multilayer films Ma and Mb may be constructed on their respective surfaces.

Figure 4:
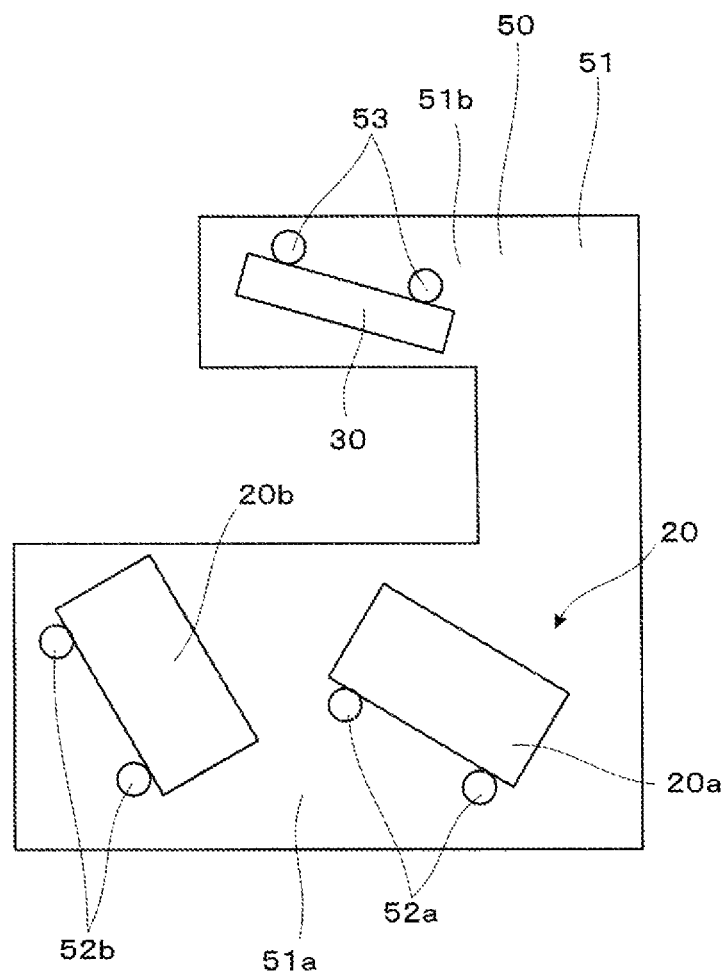
FIG. 4 illustrates a fixing member.

An example of a method for fixing the optical attenuator 20 and the light reflector 30 is described below with reference to FIG. 4. As illustrated in FIG. 4, the first optical attenuator 20a, the second optical attenuator 20b, and the light reflector 30 are positioned and fixed by a pair of cylindrical rod members.

More specifically, the fixing member 50 includes a U-shaped plate member 51 on which the optical attenuator 20 and the light reflector 30 are placed. The fixing member 50 also includes a pair of cylindrical rod members 52a and 52a for fixing the first optical attenuator 20a of the optical attenuator 20 at a certain angle and at a certain position on an end 51a of the plate member 51, and a pair of cylindrical rod members 52b and 52b for fixing the second optical attenuator 20b at a certain angle and at a certain position on the end 51a. The fixing member 50 further includes a pair of cylindrical rod members 53 and 53 for fixing the light reflector 30 at a certain angle and at a certain position on another end 51b of the plate member 51. The optical attenuator 20 and the light reflector 30 are mounted to and come in contact with both cylindrical rod members of the corresponding pair so as to be disposed in a state where proper angular and disposition relationships is maintained and a required space is further ensured. As described above, the fixing member 50 is a member for fixing the optical attenuator 20 and the like, and in particular, functions as an angular fixing member that fixes the first optical attenuator 20a and the second optical attenuator 20b, which constitute the optical attenuator 20, and the light reflector 30, to maintain their angular relationship. The fixing member 50 fixes these members to maintain their angular relationship and maintain a disposition relationship among the members, and the laser source unit 10 and the light scanner 40 which are separately installed in the housing SC. Thus, an accurate angular relationship in the optical attenuator 20 as described with reference to FIG. 3A to 3D is maintained.

As described above, in First Exemplary Embodiment, even when the optical attenuator 20 is damaged, a component of a laser beam with high intensity emitted from the laser source unit 10 is prevented from not being attenuated and traveling to the eyes EY of the observer, and thus safety is increased. In normal use state, with respect to the normally operating optical attenuator 20, even when the refractive angle of the modulated light L entering the optical attenuator 20 in a state where the components of different wavelengths are combined is changed depending on the components of different wavelengths, the refracted components are again combined when emitted from the optical attenuator 20, and thus an appropriate color image is formed.

Figure 5:
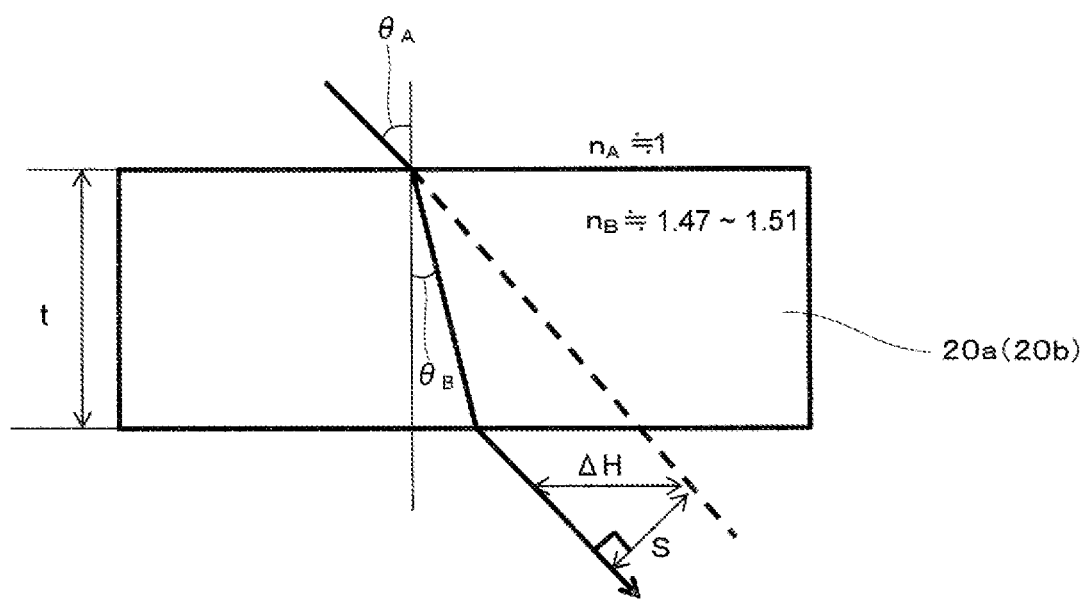
FIG. 5 illustrates an example of shift of an optical path in the optical attenuator.

A specific example (specifications) of a neutral density filter and the like which constitute the optical attenuator 20 achieving the object described above is described below with reference to FIG. 5 and the like. FIG. 5 is a diagram illustrating a specific example of the first optical attenuator 20a (or the second optical attenuator 20b) constituting the optical attenuator 20. As illustrated in FIG. 5, an incident angle of a light beam entering the first optical attenuator 20a is referred to as $\theta_A$, a light refractive angle as $\theta_B$, a refractive index of air as $n_A$, and a refractive index of the martial of the first optical attenuator 20a as $n_B$. A thickness of the first optical attenuator 20a, which is a parallel flat plate, is referred to as t, a shift amount at a surface of the first optical attenuator 20a (a horizontal width of the surface of the first optical attenuator 20a in FIG. 5) as $\Delta H$, and a shift amount in a direction perpendicular to the direction of an optical path as S. Of these parameters, it is significant to ensure the shift amount S as large as possible such that the optical path of the modulated light L to deviate from the mirror surface MM by shifting the optical path. In terms of determining a required size of the first optical attenuator 20a, the shift amount $\Delta H$ is a significant factor. The shift amounts S and $\Delta H$ are proportional to the thickness t. That is, the thickness t is determined depending on the required shift amounts.

Based on the above conditions, the relationship among the incident angle $\theta_A$, the refractive angle $\theta_B$, the refractive index $n_A$ and $n_B$, and the shift amounts S and $\Delta H$ is represented using Snell's law and trigonometric functions as follows:

$$\theta B = a\sin\left(\frac{n_A}{n_B}\sin(\theta A)\right)$$

$$\Delta H = t\{\tan(\theta A) - \tan(\theta B)\}$$

$$s = \Delta H \sin(\theta A)$$

Figure 6A:
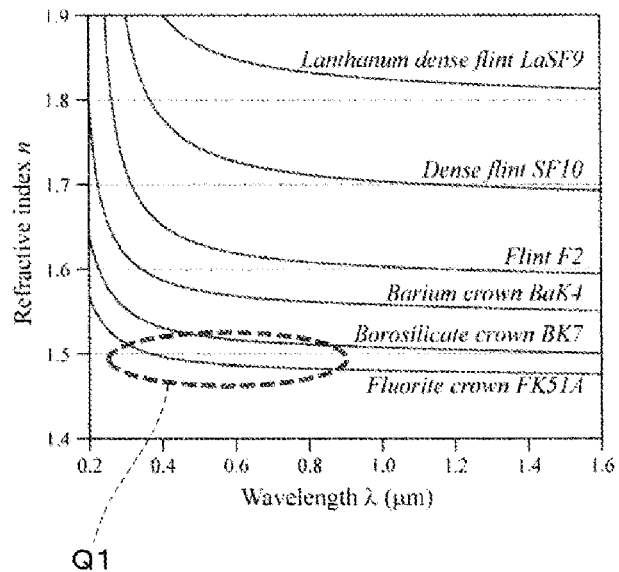
FIG. 6A is a graph illustrating characteristics of an example of a material used in the optical attenuator.
Figure 6B:
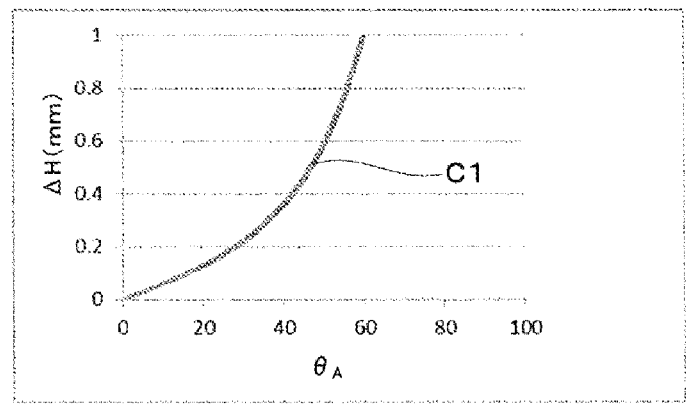
FIG. 6B is a graph illustrating a shift amount on a surface of the optical attenuator.

Thus, based on these relational expressions, the above parameters are determined depending on the required shift amount S. For example, as the refractive index $n_B$, that is, the material of the first optical attenuator 20a, a material having characteristics such as a graph illustrated in FIG. 6A may be used (The refractive index $n_A$ may be approximately 1.). In the graph of FIG. 6A, the abscissa is light wavelength λ (unit: nm) and the ordinate is refractive index $n_B$. In the example illustrated in FIG. 6A, as can be seen from the range enclosed by a broken line Q1, a material having a value of the refractive index $n_B$ is from about 1.47 to 1.51 over the whole visible light wavelength range and very little variation in the refractive index is selected. In this example, as illustrated in FIG. 6B and FIG. 6C, over the whole visible light wavelength range, the shift amount $\Delta H$ against the incident angle $\theta_A$ on the abscissa under the condition where the thickness t=1.0 mm has a relationship as represented by a curve C1 (more correctly, slightly different depending on a value of the refractive index $n_B$), and the shift amount S has a relationship as represented by a curve C2 (the same as described above) from the relational expressions.

Figure 7A:
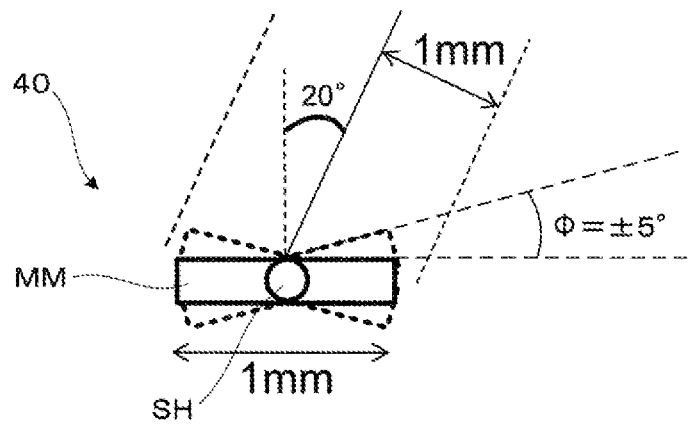
FIG. 7A illustrates an example of a mirror surface of a light scanner.

As exemplified in FIG. 7A, a specific example (specifications) of the mirror surface MM of the light scanner 40 may have a diameter of about 1 mm and a swing range (mechanical angles) of about ±5°, for example. As illustrated in FIG. 7A, the modulated light L passing through the second optical attenuator 20b may be designed to enter from a direction inclined at 20° with respect to the home position (at a swing angle of 0°) of the mirror surface MM, for example. The modulated light L may have a beam diameter of about 1 mm. In this case, when the beam diameter of the mirror surface MM is almost the same as the diameter of the mirror surface MM, the shift amount S is also almost 1 mm, when one of the first optical attenuator 20a or the second optical attenuator 20b is damaged, the other optical attenuator makes a sufficient degree of shift to achieve the object.

Figure 6C:
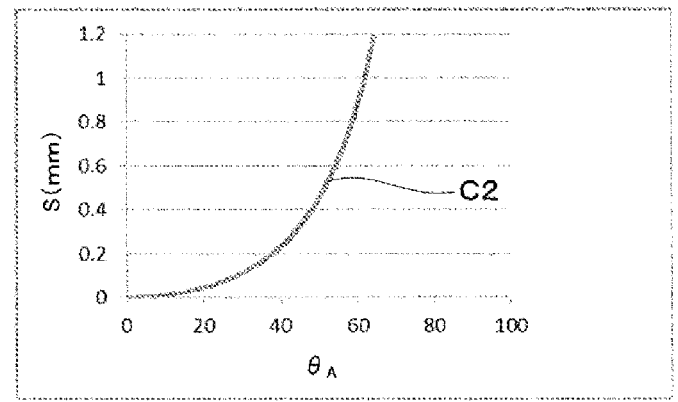
FIG. 6C is a graph illustrating a shift amount in a direction perpendicular to a direction of an optical path.
Figure 7B:
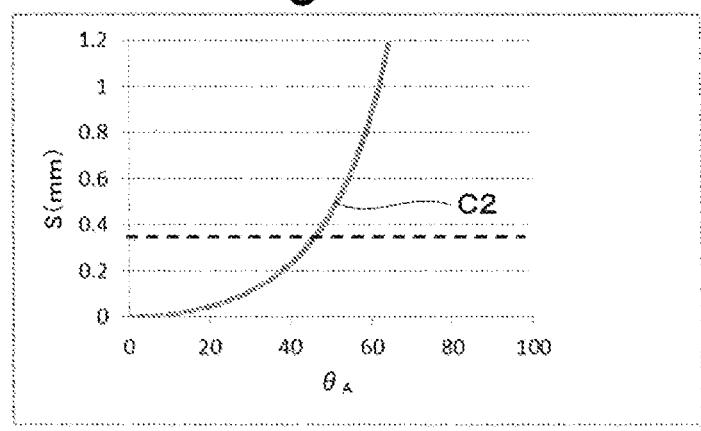
FIG. 7B illustrates a thickness of the optical attenuator.
Figure 7C:
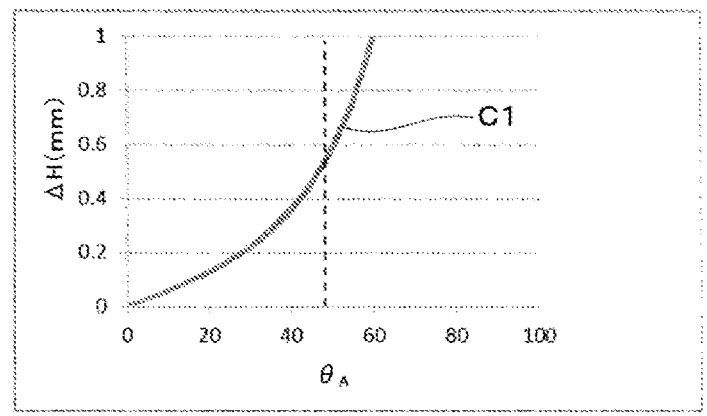
FIG. 7C illustrates a width of the optical attenuator.

In that configuration, the shift amount S against the incident angle $\theta_A$ under the condition where the thickness t=1.0 mm has the relationship as illustrated in FIG. 6C or FIG. 7B. For example, when a neutral density filter with a thickness of about 3.0 mm is used to provide the same configuration, the shift amount S is 0.36 mm under the conditions where the thickness t=1.0 mm and the incident angle $\theta_A$=47°, as represented by the broken line in FIG. 7B. Accordingly, the first optical attenuator 20a (or the second optical attenuator 20b) with a thickness of 3.1 mm causes a shift amount S of about 1 mm. In this case, as represented by the broken line in FIG. 6B or FIG. 7C, the shift amount ΔH is about 0.5 mm under the conditions where the thickness t=1.0 mm and the incident angle $\theta_A$=47°. Under the condition where the thickness t=3.1 mm, which is about three times of 1.0 mm, the shift amount ΔH is required to be about 0.5 mm×3=1.5 mm. In addition, taking into account that the modulated light L with a beam diameter of about 1 mm moves in the horizontal direction, the shift amount ΔH may has a width about 3 mm for each side (between the center and the edge), that is, about 6 mm for both sides (between one edge and the other edge). In other words, the first optical attenuator 20a (or the second optical attenuator 20b) may has a width of about 6 mm or greater.

Figure 8:
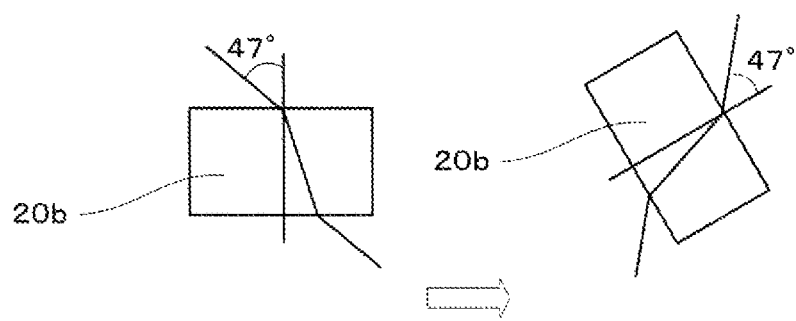
FIG. 8 illustrates a disposition of the optical attenuator with respect to the light scanner.

Taking into account that the modulated light L is designed to enter from a direction inclined at 20° with respect to the home position of the mirror surface MM, for example, the second optical attenuator 20b is required to be further inclined from the state of FIG. 5, as illustrated in FIG. 8. The respective parameters described above are examples, and may have a variety of values, directions of refraction, degrees, and the like depending on designs.

Described below with reference to FIG. 9 and the like are a specific example of a configuration and the like of elements of an optical system of the image light generator 200A, and an example of an optical path when the first optical attenuator 20a or the second optical attenuator 20b is damaged.

Figure 9:
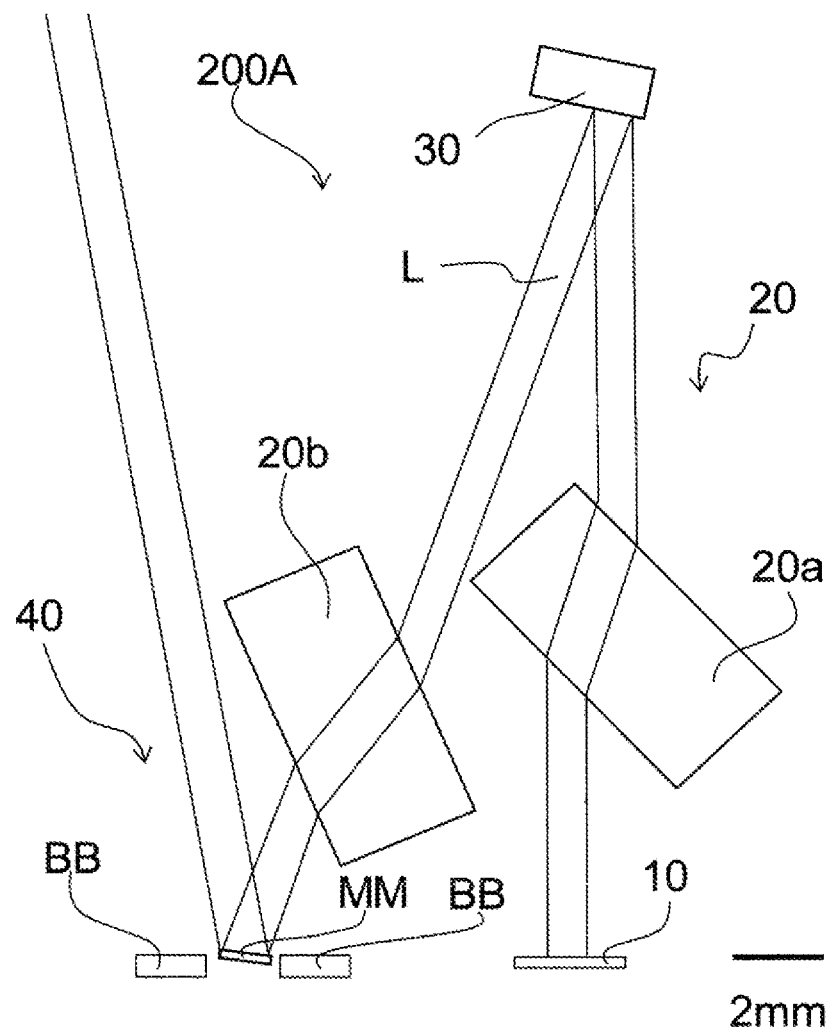
FIG. 9 illustrates a specific configuration example of a disposition of an optical system.
Figure 10:
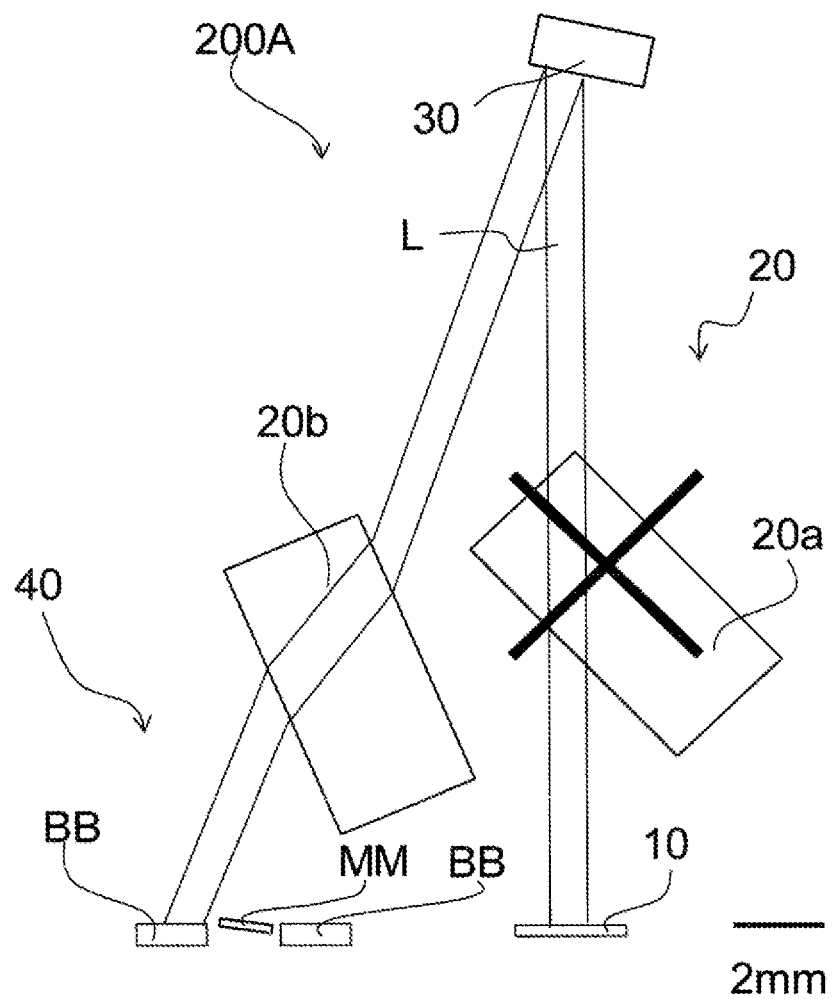
FIG. 10 illustrates an optical path in a case that a first optical attenuator is damaged in FIG. 9.
Figure 11:
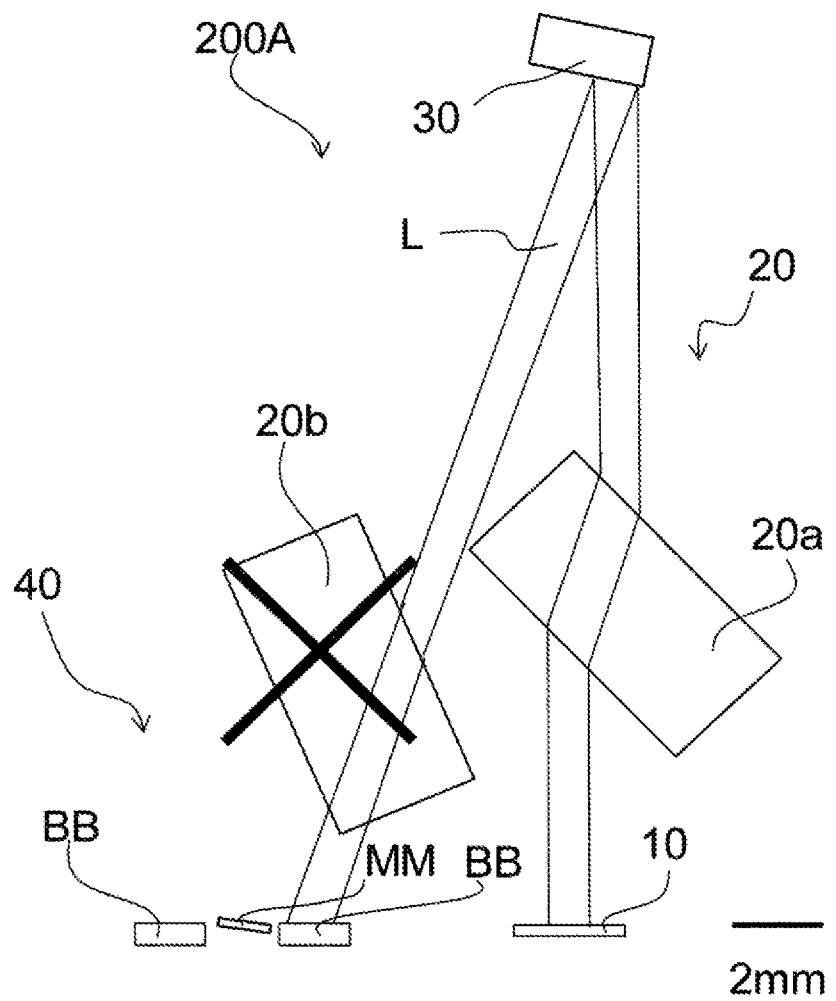
FIG. 11 illustrates an optical path in a case that a second optical attenuator is damaged in FIG. 9.

FIG. 9 illustrates a specific configuration example of a disposition of an optical system of the image light generator 200A. That is, a disposition example of the laser source unit 10, the optical attenuator 20, the light reflector 30, and the light scanner 40 is illustrated. FIG. 9 also illustrates a scale of 2 mm for their dimensions. In FIG. 9, the light reflector 30 is inclined at 10° with respect to a direction of a light beam emitted from the laser source unit 10, and as a result, the modulated light L is inclined at 20° from the direction with respect to the light scanner 40. In the light scanner 40, the mirror surface MM has a swing range (mechanical angles) of ±5°. As described above, the modulated light L is shifted by the first optical attenuator 20a and the second optical attenuator 20b, which constitute the optical attenuator 20, and enters the mirror surface MM of the light scanner 40. By contrast, FIG. 10 illustrates an optical path of the modulated light L in a case that the first optical attenuator 20a is damaged in FIG. 9. In other words, in FIG. 10, under a situation where a refractive effect does not occur in the first optical attenuator 20a, the modulated light L travels to and is reflected by the light reflector 30, and a refractive effect occurs in the second optical attenuator 20b. In this situation, the modulated light L enters a surrounding member BB disposed deviated from the mirror surface MM in the light scanner 40. FIG. 11 illustrates an optical path of the modulated light L in a case that the second optical attenuator 20b is damaged in FIG. 9. In other words, in FIG. 11, under a situation where a refractive effect occurs in the first optical attenuator 20a, the modulated light L travels to and is reflected by the light reflector 30, but a refractive effect does not occur in the second optical attenuator 20b. In this situation, the modulated light L still deviates from the mirror surface MM in the light scanner 40, and enters another surrounding member BB disposed opposite to the surrounding member BB in the case of FIG. 10. As described above, in the specific configuration example, when the first optical attenuator 20a or the second optical attenuator 20b is damaged, the optical path of the modulated light L is diverted from the mirror surface MM.

Second Exemplary Embodiment

A head-mounted display according to Second Exemplary Embodiment will be described below with reference to FIG. 12 and the like. Second Exemplary Embodiment is a modified example of First Exemplary Embodiment, and has substantially identical configuration of First Exemplary Embodiment except for a light shutter additionally provided. Accordingly, like references refer to elements having the same functions, and their detailed description is not repeated.

Figure 12:
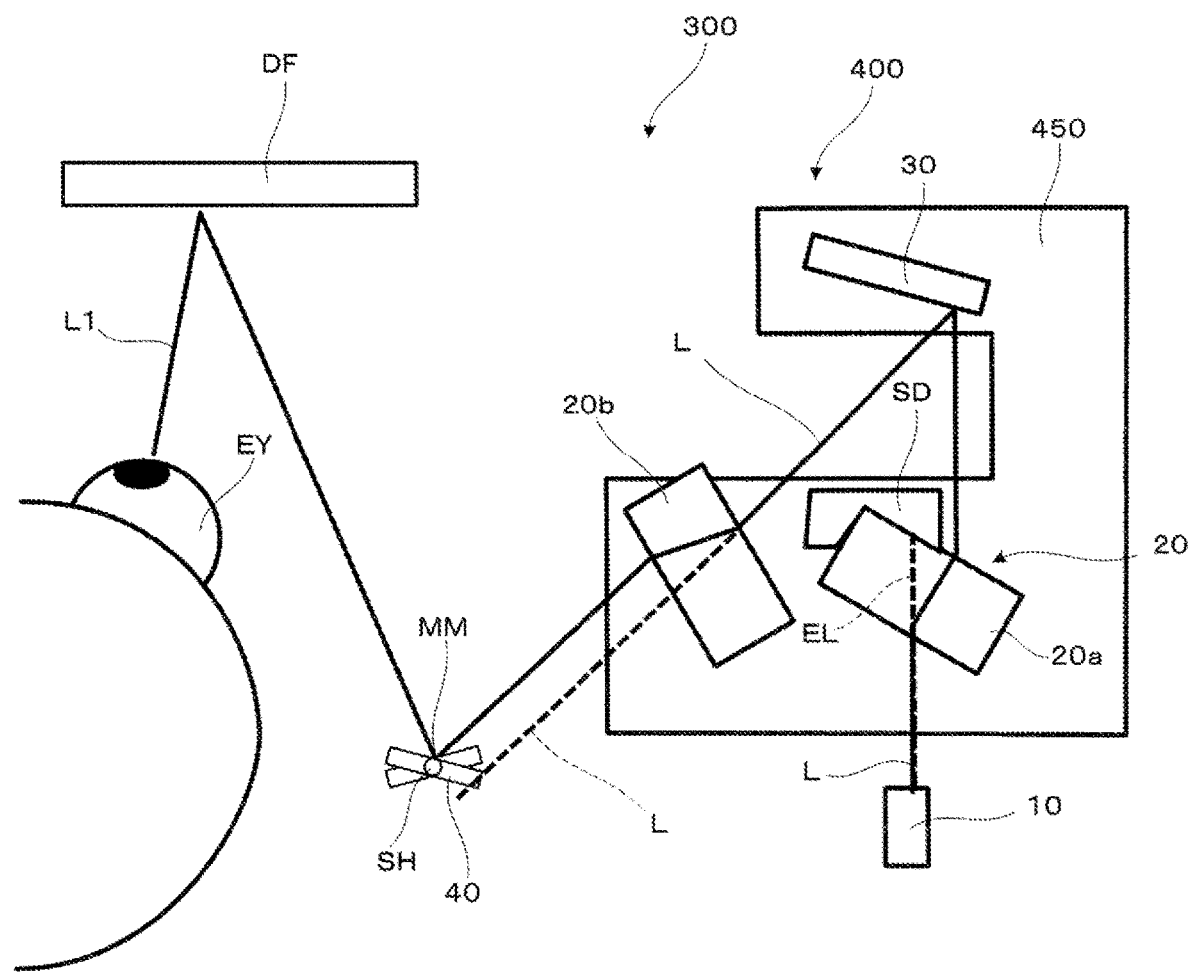
FIG. 12 conceptually illustrates a head-mounted display according to Second Exemplary Embodiment.

As illustrated in FIG. 12, a head-mounted display 300 according to Second Exemplary Embodiment includes a light shutter SD in a fixing member 450 of a display unit 400 for the right eye.

The light shutter SD is a member configured to shut out a laser beam by, for example, absorbing the laser beam, to prevent the laser beam from traveling downstream of the optical path. The light shutter SD is coated with a black resist such as a carbon resin to perform an expected function. In Second Exemplary Embodiment, as illustrated in FIG. 12, the light shutter SD is disposed in an optical path EL in a case that there is no shift of the optical path of the modulated light L, which is a laser beam, due to a refractive effect at the first optical attenuator 20a. Specifically, the optical path EL is a course in an extension line of the modulated light L that is emitted from the laser source unit 10 and travels straight. The light shutter SD is disposed at a position that is in the optical path EL and closer to the downstream side of the optical path than the light shutter SD. In that disposition, when the first optical attenuator 20a is damaged and does not exert a refractive effect on the modulated light L, the modulated light L travels in the optical path EL and reaches the light shutter SD. The light shutter SD shuts out the entering modulated light L by, for example, absorbing the modulated light L to prevent the modulated light L from traveling forward. Thus, the modulated light L not attenuated is prevented from traveling to the eyes EY of the observer. A case that the second optical attenuator 20b is damaged is the same as the case in First Exemplary Embodiment, and its description is not repeated.

Figure 13:
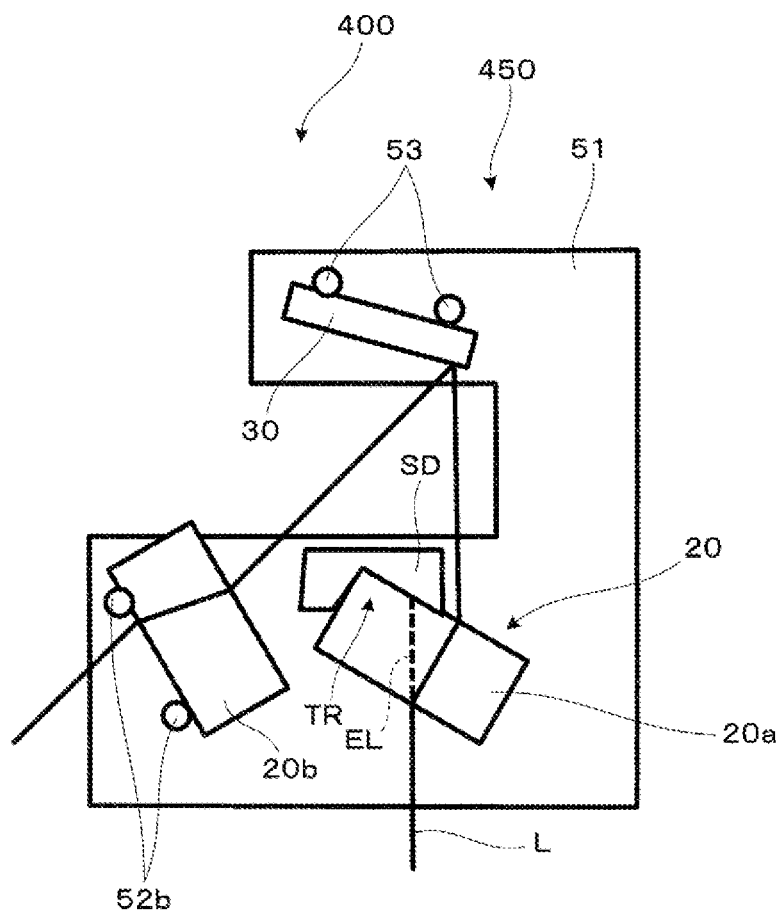
FIG. 13 illustrates a fixing member.

Moreover, in an example illustrated in FIG. 12, the light shutter SD also functions as a fixing member for supporting and fixing the first optical attenuator 20a. FIG. 13 illustrates a configuration of the fixing member 450 of the head-mounted display 300, and corresponds to FIG. 4. As is clear from comparison between FIG. 13 and FIG. 4, in Second Exemplary Embodiment, the light shutter SD fixes the first optical attenuator 20a at a certain angle and at a certain position, instead of the pair of cylindrical rod members 52a and 52a illustrated in FIG. 4. Specifically, the light shutter SD has a recess TR that fits the shape of a corner of the first optical attenuator 20a. The corner of the first optical attenuator 20a, which is a flat plate member, comes into contact with the recess TR of the light shutter SD, so that the first optical attenuator 20a is disposed at an accurate angle and at an accurate position with respect to the other members.

As described above, in Second Exemplary Embodiment, the optical attenuator 20, when damaged, loses not only the light attenuation function but also part of the optical path shift function utilizing the refractive effect at the optical attenuator 20, and thus an optical path shift function in a normal state is lost. Therefore, the optical path of the modulated light L, which is a laser beam, is diverted from the direction toward the mirror surface MM, that is, the direction toward the eyes EY of the observer. As a result, a component of the laser beam with high intensity emitted from the laser source unit 10 is prevented from not being attenuated and traveling to the eyes EY of the observer directly, and thus safety is increased. In the case of Second Exemplary Embodiment, when the first optical attenuator 20a is damaged, a laser beam does not travel downstream of the optical path from the first optical attenuator 20a. Thus, for example, even when both of the first optical attenuator 20a and the second optical attenuator 20b are damaged, safety is also ensured.

Third Exemplary Embodiment

A head-mounted display according to Third Exemplary Embodiment will be described below with reference to FIG. 14. Third Exemplary Embodiment is a modified example of First Exemplary Embodiment and the like, and has almost the same configuration of First Exemplary Embodiment and the like except for a light shutter in place of the surrounding member around the mirror surface. Accordingly, like references refer to elements having the same functions, and their detailed description is not repeated.

Figure 14:
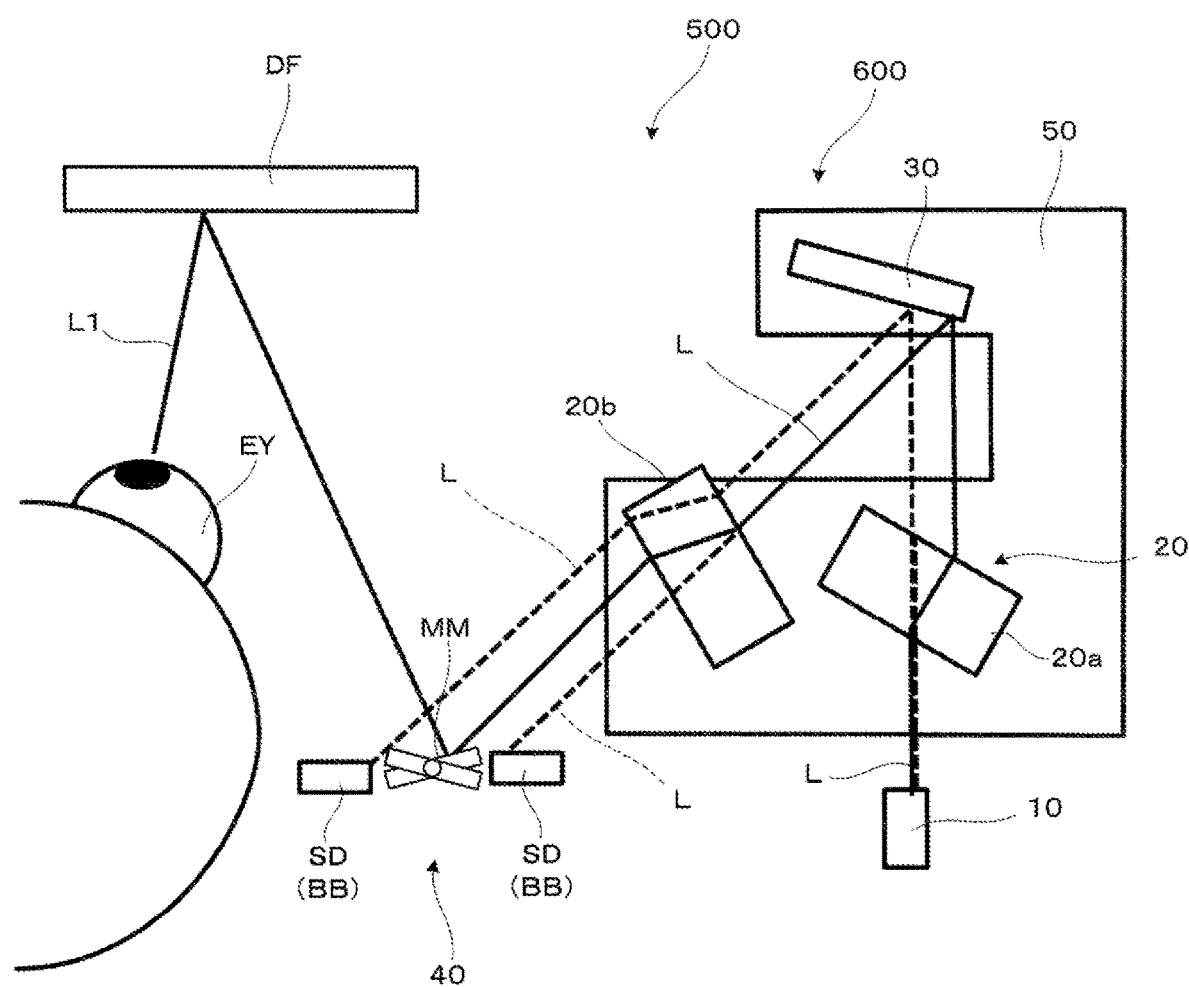
FIG. 14 conceptually illustrates a head-mounted display according to Third Exemplary Embodiment.

As illustrated in FIG. 14, a head-mounted display 500 according to Third Exemplary Embodiment includes the light shutter SD serving as the surrounding member BB around the mirror surface MM in the light scanner 40 of a display unit 600 for the right eye.

For example, as in the specific example illustrated in FIG. 9 to FIG. 11, when the optical attenuator 20 is damaged, the modulated light L travels to a surrounding region deviated from the mirror surface MM in the light scanner 40, and for example, enters the surrounding member BB provided around the mirror surface MM. Therefore, it is also significant to perform an appropriate process on a component of light entering the surrounding member BB. In this respect, in Third Exemplary Embodiment, as in the case of Second Exemplary Embodiment, the surrounding member BB is also constructed from the light shutter SD preventing a laser beam from traveling downstream of the optical path, for example, by absorbing the laser beam. In that configuration, the surrounding member BB serving as the light shutter SD absorbs the entering modulated light L.

In other words, in Third Exemplary Embodiment, when the optical attenuator 20 is damaged, the optical path of the modulated light L, which is a laser beam, is diverted from the direction toward the mirror surface MM, that is, the direction toward the eyes EY of the observer. As a result, a component of the laser beam with high intensity emitted from the laser source unit 10 is prevented from not being attenuated and traveling to the eyes EY of the observer, and thus safety is increased.

Other Exemplary Embodiment

The disclosure is provided through some exemplary embodiments described above, but is not limited thereto. Various modifications may be made without departing from the scope of the disclosure.

Figure 15:
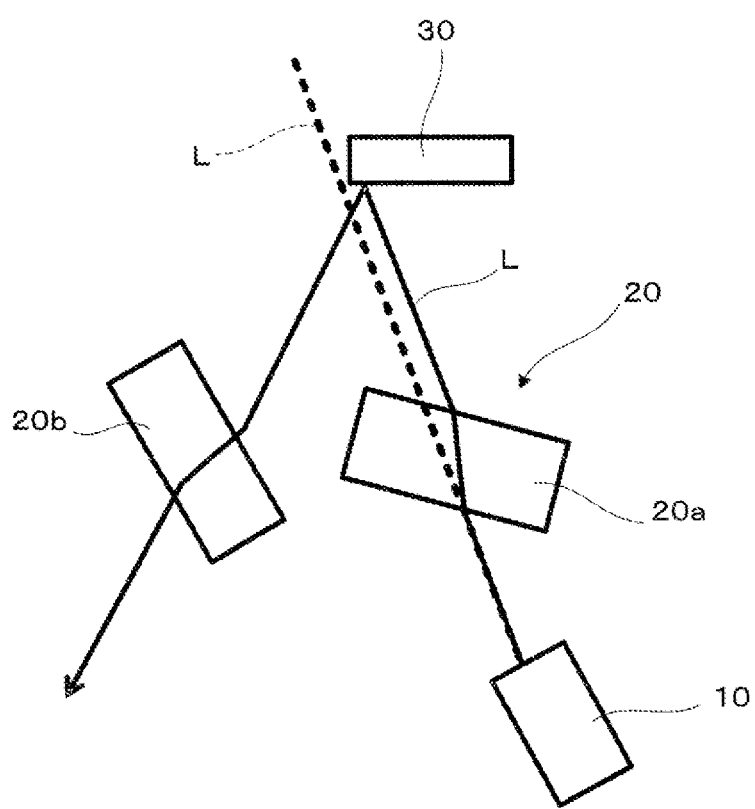
FIG. 15 illustrates a modified example of a disposition of an optical system of the head-mounted display.

In the exemplary embodiments described above, it is not assumed that an optical path is diverted from the light reflector 30. However, for example, as a modified example illustrated in FIG. 15, the light reflector 30 may be disposed such that an optical path in which the modulated light L represented by a broken line is to travel deviates from the light reflector 30 when the first optical attenuator 20a is damaged and does not exert a refractive effect on the modulated light L. That is, the light reflector 30 may be disposed at a position deviated from the optical path of the modulated light L, which is a laser beam, in a case that there is no shift of the optical path due to the refractive effect at the first optical attenuator 20a.

Figure 16:
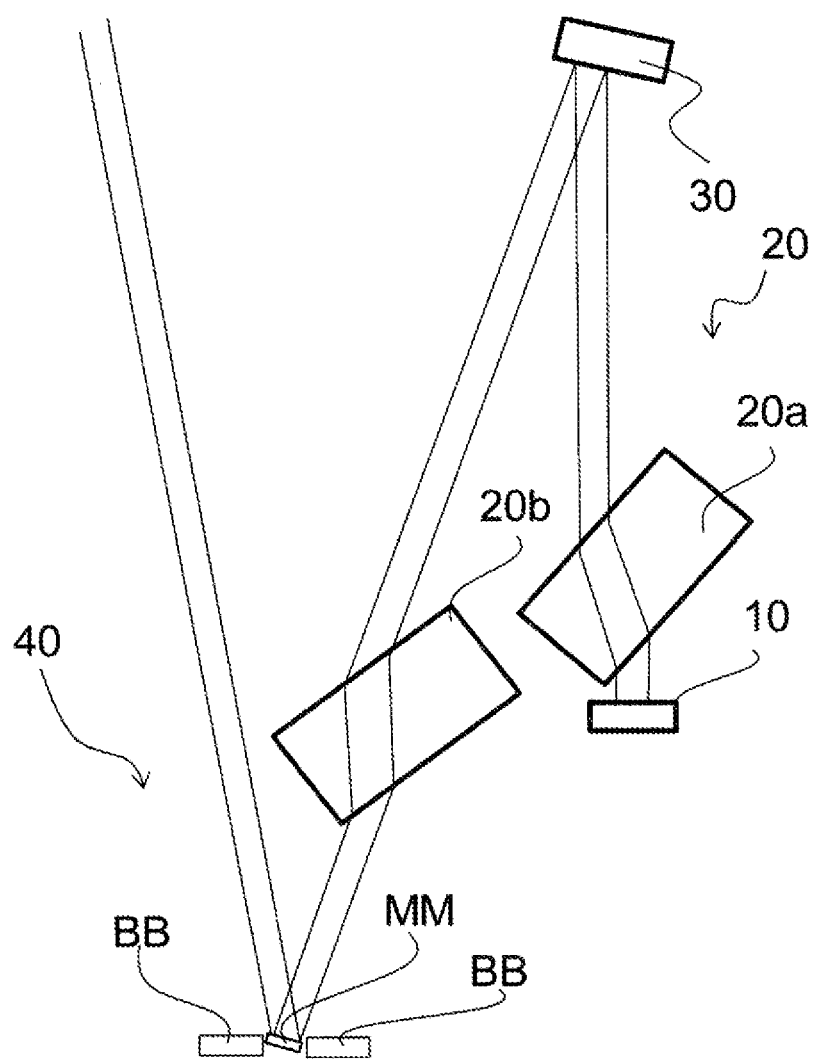
FIG. 16 illustrates another specific configuration example of the disposition of the optical system.

In the exemplary embodiments described above, the first optical attenuator 20a and the second optical attenuator 20b of the optical attenuator 20 shift the modulated light L to the right side with respect to the traveling direction. However, as illustrated in FIG. 16, the optical attenuators may be configured to shift the modulated light L to the left side with respect to the traveling direction to achieve the same object.

Figure 17:
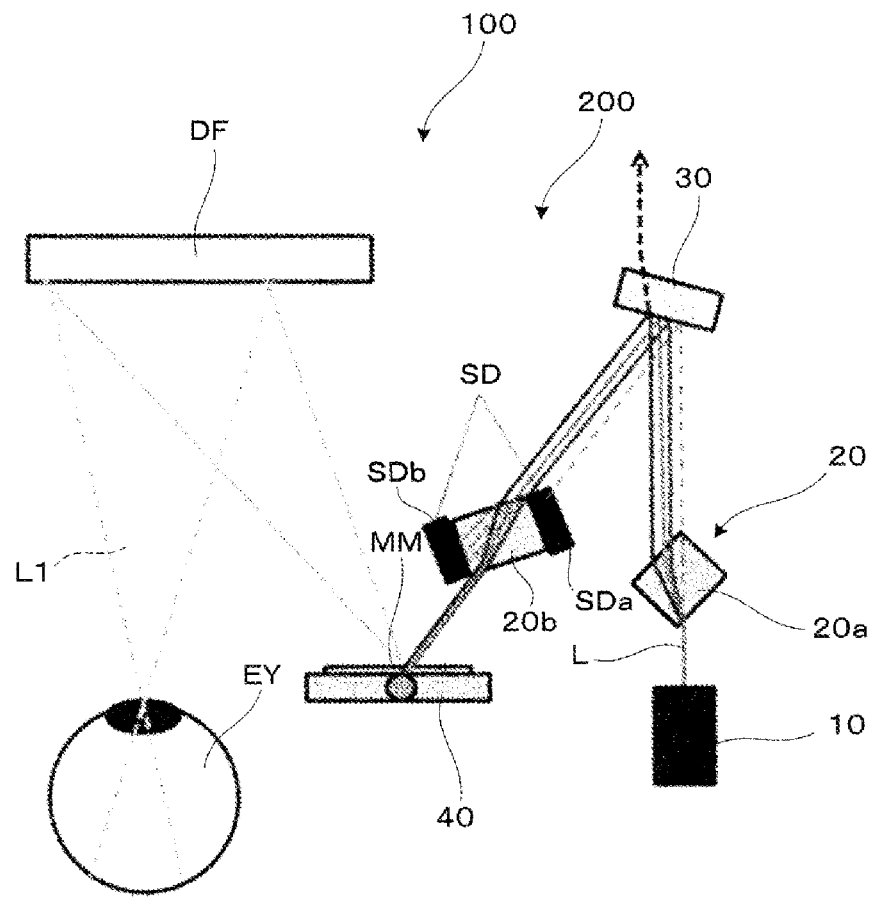
FIG. 17 illustrates a modified example of a disposition of a light shutter.

Furthermore, the light shutter SD may be disposed at another position other than the position described above, for example, at each position of both ends of the second optical attenuator 20b, as illustrated in FIG. 17. In the example illustrated in FIG. 17, a first light shutter SDa, which is one of the light shutters SD disposed at one end, shuts out the modulated light L when the first optical attenuator 20a is damaged, and a second light shutter SDb, which is the other of the light shutters SD disposed at the other end, shuts out the modulated light L when the second optical attenuator 20b is damaged. The light shutter SDb may be designed with a shape, a size, and the like as appropriate while taking into account light dispersion (a difference in optical path among the color light beams) caused by the refractive effect at the first optical attenuator 20a.

Any combination of the exemplary embodiments and modified examples as described above, as appropriate, may configure a head-mounted display. For example, light shutters may be provided at a plurality of positions.

In the configurations described above, the head-mounted display is exemplified as an image display device. However, the disclosure, not limited thereto, may be applied to a small projector or a head-up display (HUD).

What is claimed is:
1. A head-mounted display comprising:
a laser source unit configured to emit a laser beam;
a light scanner configured to perform scanning with the laser beam emitted from the laser source unit;
an optical attenuator disposed in an optical path between the laser source unit and the light scanner, the optical attenuator being configured to attenuate a passing laser beam and shift an optical path of the passing laser beam by utilizing a refractive effect to guide the laser beam toward a mirror surface of the light scanner, wherein the optical attenuator includes a first optical attenuator and a second optical attenuator; and
a light reflecting mirror configured to bend the laser beam passing through the first optical attenuator to guide the laser beam toward the second optical attenuator.

2. The head-mounted display according to claim 1, wherein
the optical attenuator is configured using a material, in a shape, and to be disposed to equalize optical path lengths of components with different wavelengths when shifting the optical path of the laser beam.

3. The head-mounted display according to claim 1, wherein
the first optical attenuator is configured to shift the optical path to divert the optical path from a direction toward the mirror surface of the light scanner, and the second optical attenuator is configured to counteract the shift of the optical path at the first optical attenuator to return the optical path back.

4. The head-mounted display according to claim 1, wherein
the second optical attenuator counteracts dispersion of the light caused by the refractive effect at the first optical attenuator.

5. The head-mounted display according to claim 1, wherein
the first optical attenuator and the second optical attenuator have an identical optical shape.

6. The head-mounted display according to claim 1, wherein
a light incident angle to the first optical attenuator and a light emission angle from the second optical attenuator are equal, and a light emission angle from the first optical attenuator and a light incident angle to the second optical attenuator are equal.

7. The head-mounted display according to claim 1, wherein
the light reflecting mirror is disposed at a position deviated from an optical path of the laser beam in a case that there is no shift of the optical path due to the refractive effect at the first optical attenuator.

8. The head-mounted display according to claim 1, wherein
the light reflecting mirror is a light attenuating reflector configured to attenuate the laser beam and guide part of the laser beam toward the second optical attenuator.

9. The head-mounted display according to claim 1, further comprising:
an angle fixing member configured to fix the first optical attenuator, the second optical attenuator, and the light reflecting mirror to maintain an angular relationship among the first optical attenuator, the second optical attenuator, and the light reflecting mirror.

10. The head-mounted display according to claim 1, further comprising:
a light shutter disposed in an optical path of the laser beam in a case that there is no shift of the optical path due to the refractive effect at the optical attenuator, to shut out the laser beam.

11. The head-mounted display according to claim 10, wherein
the light shutter is a fixing member configured to fix the optical attenuator.

12. The head-mounted display according to claim 1, wherein
the optical attenuator includes a plurality of flat plate members.

13. An image display device comprising:
a laser source unit configured to emit a laser beam;
a light scanner configured to perform scanning with the laser beam emitted from the laser source unit;
an optical attenuator disposed in an optical path between the laser source unit and the light scanner, the optical attenuator being configured to attenuate a passing laser beam and shift an optical path of the passing laser beam by utilizing a refractive effect to guide the laser beam toward a mirror surface of the light scanner, wherein
the optical attenuator includes a first optical attenuator and a second optical attenuator; and
a light reflecting mirror configured to bend the laser beam passing through the first optical attenuator to guide the laser beam toward the second optical attenuator.

14. The head-mounted display according to claim 1, wherein
the optical path between the laser source unit and the light scanner includes a first optical path and a second optical path,
the first optical attenuator is disposed in the first optical path between the laser source unit and the light reflecting mirror, and
the second optical attenuator is disposed in the second optical path between the light reflecting mirror and the light scanner.

* * * * *